Feb. 3, 1970    J. L. DOOLEY    3,493,066
VEHICLE POWER SYSTEM INTENDED FOR REDUCED AIR POLLUTION
Filed Feb. 24, 1968

INVENTOR
JAMES L. DOOLEY

BY Burns, Doane, Benedict, Swecker & Mathis

ATTORNEYS

United States Patent Office 3,493,066
Patented Feb. 3, 1970

3,493,066
VEHICLE POWER SYSTEM INTENDED FOR REDUCED AIR POLLUTION
James L. Dooley, Santa Monica, Calif., assignor to McCulloch Corporation, Los Angeles, Calif., a corporation of Wisconsin
Filed Feb. 28, 1968, Ser. No. 709,054
Int. Cl. B60k 9/04
U.S. Cl. 180—54     14 Claims

ABSTRACT OF THE DISCLOSURE

A power system for a vehicle of the type including a body having power responsive, motion producing means. The power system includes engine means adapted for operative connection with the motion producing means to supply power thereto for inducing body movement. Power take-off means is connected with the engine means for diverting a proportion of the power output of the engine means. Power storage means connected with the power take-off means accumulates and stores the power diverted. Selectively operable power connection means connects the engine means with the power storage means to supply stored power therefrom to the engine means at predetermined times.

Figure 1:
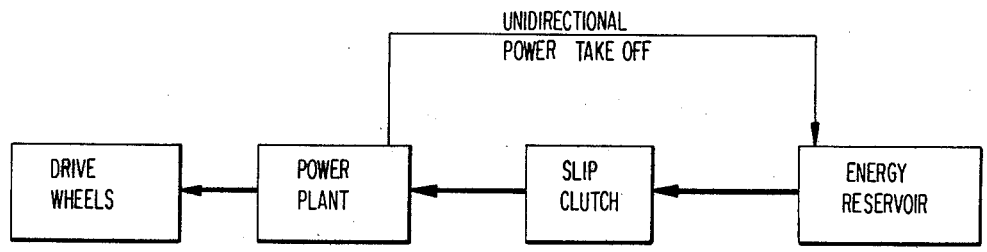

A method aspect of the invention includes providing an engine to supply mechanical power to the motion producing means and in diverting a portion of the mechanical power output of the engine to drive a flywheel which is rotated to store mechanical energy in the flywheel. The flywheel is selectively engaged with the engine to provide a mechanical power supplement therefor a predetermined times.

BACKGROUND OF THE INVENTION

This invention relates to a vehicle power system intended to reduce air pollution as well as improve vehicle performance.

In powering automobiles, it is common to provide a pair of ground-engaging drive wheels connected with the automobile body and a combustion engine drivingly connected with the wheels. In order to provide for satisfactory acceleration of the vehicle, it is usually necessary to provide an engine capable of delivering power for acceleration considerably in excess of that required to sustain motion of the vehicle at uniform velocity at its customary cruising speeds. In such a system, the engine may be relatively lightly loaded during many periods such as in-town cruising in traffic with the result that the engine operates at considerably less than its peak efficiency.

Various adverse results commonly arise from operation of the engine in this condition and may include, most significantly, an increased degree of air pollution. This air pollution is inherently likely to be greater in an engine of large displacement than in a smaller engine because of the greater through-put of combustion products in the larger engine. In addition, during periods of rapid acceleration, the volume of exhaust products put out by a large engine may be considerable. Other air pollution problems arising from the use of large-capacity automobile engines may sometimes occur on starting. Because of the considerable inertia of the relatively massive moving parts in a large engine it may on some occasions, such as in very cold weather when the surrounding lubricating oil is very viscous, be difficult for the usual electric starter to turn the engine over sufficiently rapidly to insure a quick start. The result in these circumstances is likely to be poor combustion and a prolonged starting period leading to the production of exhaust gases containing large amounts of only partially burnt fuel accompanied by unpleasant quantities of smoke and smell.

Although it has hitherto been possible to tolerate inefficient air polluting vehicle systems of the type described, the provision of smog-control laws in several states and a general concern with the carcinogenic and other undesirable properties of vehicle-produced air pollution has led to a changed situation. It is now particularly desirable therefore that a vehicle system possessing the same qualities of motive performance as are presently available but producing considerably less air pollution, should be developed.

One way in which air pollution may be reduced is of course to use a power plant of smaller volumetric capacity such as are, for example, commonly provided in European cars. However, this has the significant disadvantage that the engine will not usually have sufficient power to provide adequate acceleration.

Another possible approach is to provide a vehicle power system utilizing an engine of relatively smaller capacity than heretofore, but capable of storing power during periods of light loading for subsequent use during periods of acceleration or heavier load. One prior device of this type includes an engine permanently mechanically connected with two massive flywheels which may aid the engine in propelling the vehicle when moving uphill. Although it is not known whether this prior device was ever successful, certain disadvantages are immediately apparent. For example, with a fixed mechanical connection between the flywheel and the engine, there could be no selective tapping of the energy stored in the flywheel at desired periods such as, for example, for overtaking another vehicle while traveling on the level. Furthermore, such a system wherein the stored energy was automatically delivered to the engine whenever the latter slowed down, could actually be dangerous during periods in which it was desired to effect rapid braking of the vehicle. Another disadvantage might arise on starting, in that the usual electric starter motor would be required to turn over not only the engine but also the two massive flywheels mechanically and permanently connected to the engine. One other earlier vehicle system obviating the disadvantage of permanent mechanical connection, utilized flywheels driven by an electric motor which received its power from an electrical generator driven by the vehicle engine. However, in this system there was no provision for delivering any of the energy stored in the flywheels back to the engine at times when additional power was desired.

SUMMARY OF INVENTION

It is therefore a general object of the invention to provide a vehicle power system intended to obviate or minimize problems of the type previously noted.

It is a particular object of the invention to provide a vehicle power system intended to function with reduced air pollution.

It is yet a further object of the invention to provide a vehicle power system utilizing an engine of reduced volumetric capacity compared to current practice but still capable of providing for adequate levels of vehicle acceleration.

It is one more object of the invention to provide a vehicle power system adapted to store a portion of the engine output during periods of light loading, which does not impose an exceptionally heavy burden upon the usual vehicle power plant.

A preferred embodiment of the invention includes a power system for a vehicle of the type including a body and power-responsive, motion-producing means connected with the body for producing movement thereof. The power system includes engine means adapted for operative connection with the motion-producing means to supply power thereto for movement of the body. Power take-off means is connected with the engine means for diverting a small proportion of the power output of the engine means to power storage means connected with the power take-off means. Power accumulated and stored in the power storage means may be selectively connected to the engine means by power connection means to redeliver stored power to the engine means at predetermined times and at extremely high rates of energy transfer.

In more detail, the engine means includes combustion engine means having drive shaft means adapted for operative connection with the motion-producing means. The power take-off means includes electrical generating means connected with the drive shaft means for providing an electrical output. The electrical generating means is in electrical connection with an electric motor means. The power storage means includes flywheel means operatively connected with the electric motor means for storing mechanical rotational energy. The power connection means includes selectively operable clutch means for connecting the flywheel means to the drive shaft means for redelivering stored power to the combustion engine means.

A method aspect of the invention is intended to provide power for a vehicle of the type having a body adapted to be moved by power-responsive, motion-producing means. The method includes the steps of providing an engine to supply mechanical power to the motion-producing means and of converting a portion of the mechanical power output of the engine to electrical power. In succeeding steps the electrical power is supplied to an electric motor drivingly connected to a flywheel which is rotated by the motor to store mechanical energy. The flywheel is selectively engaged with the engine at predetermined times to provide redelivered stored mechanical energy to the engine.

THE DRAWINGS

Figure 2:
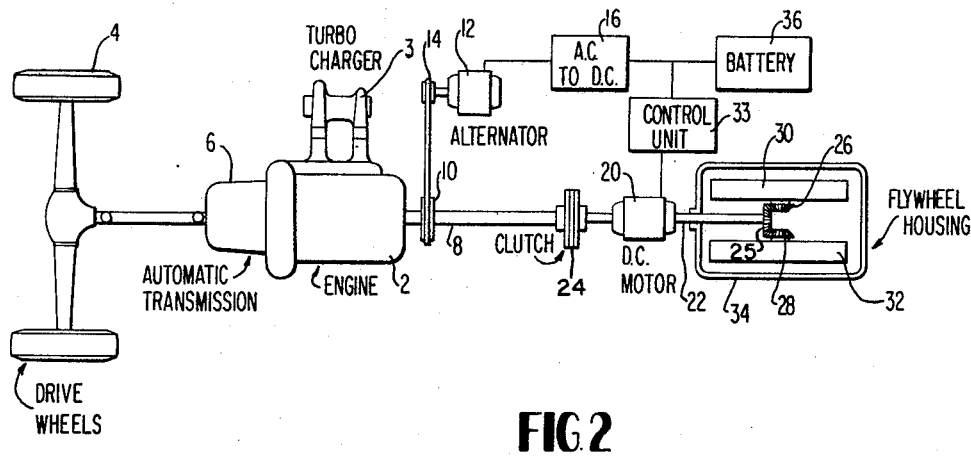

A preferred embodiment of the invention is illustrated in the accompanying drawings in which:

FIGURE 1 is a representational, block diagram of a vehicle power system according to a preferred embodiment of the invention; and FIGURE 2 is a diagram of one particular vehicle power system consistent with the broad system shown in FIGURE 1.

DETAILED DESCRIPTION

General outline

Referring to FIGURE 1 of the drawings, a preferred embodiment of a vehicle power system according to the present invention is there shown. The vehicle system includes a vehicle having drive wheels mechanically connected via an automatic transmission (a manual transmission may alternatively be used) to the output of a power plant which may be a typical combustion engine. A portion of the output of the power plant is diverted by a power take-off when the power plant is operating at less than full load and is delivered to an energy reservoir where it is accumulated and stored. At selected times of increased load on the engine, such as, for example, when it is desired to overtake another vehicle, the energy reservoir may be connected with the power plant by a slip clutch to deliver part of the energy stored in the energy reservoir to the power plant to enable it to meet the increased power demand being made upon it.

Elements of the system

One particular vehicle system consistent with the broad outline of the invention just described is shown in FIGURE 2. The particular embodiment shown in FIGURE 2 includes an automobile engine 2 drivingly connected with a pair of vehicle drive wheels 4 by an automatic transmission 6. The engine 2, transmission 6, and drive wheels 4 are all commercially available items not requiring any special modification for the purpose of the invention.

However, the engine 2 is of relatively smaller volumetric displacement for the particular total weight of the vehicle plus engine than is current in conventional automobile practice. Although the engine 2 is of sufficient power to maintain the vehicle in uniform motion at customary maximum cruising speeds for the weight and type of vehicle concerned, the rate of acceleration of the velocity by the engine 2 alone to that velocity would be unduly slow although this disadvantage will be eliminated as will be described.

It will be readily appreciated that use of an engine of smaller volumetric capacity than that employed in conventional practice for the particular body weight of the vehicle, will provide a reduction in the amount of air pollution produced in use of the automobile. It is additionally desirable that the engine 2 should be a diesel engine, as it is known that such an engine produces reduced emission of air pollutants as compared to a spark ignition automobile engine of the same displacement. A description of the relative merits of diesel and spark ignition engines from the standpoint of air pollution is provided in "The Diesel Vehicle and Its Role in Air Pollution," published by the Department of Public Health for the State of California. However, other forms of engine, such as, for example, a small gas turbine, may be used if necessary in particular circumstances.

The engine 2 may be provided with a turbo charger 3 to increase its power output. Connected to the usual engine crankshaft (not shown) of the engine 2 is an engine input shaft 8 provided with a fixed pulley 10.

A conventional automobile alternator 12 having a drive pulley 14 is drivingly connected with the shaft pulley 10 on the engine input shaft so that as the engine input shaft 8 rotates during operation of the engine, the alternator 12 is driven to produce alternating current. The alternating current output from the alternator 12 is applied to a conventional, current converter 16 for converting the alternating current to direct curent. Any commecially available form of converter such as a rotary converter, or selenium bridge full wave rectifier may be used as desired. A conventional automobile D.C. generator could alternatively be utilized, if desired, to provide the necessary D.C. output.

The rectified D.C. output of the converter 16 is applied to a direct current motor 20 having a power shaft 22 passing entirely through the motor 20 and aligned concentrically with the engine input shaft 8. The adjacent ends of the engine shaft 8 and the power shaft 22 may be selectively, drivingly connected together by a selectively operated, conventional, slip clutch 24 interposed between and connected to the shafts. In the preferred embodiment, the clutch 24 is under the direct control of the driver of the vehicle for operation at any desired time. However, the control of the clutch may additionally be connected by suitable linkage to the usual vehicle accelerator pedal so that the clutch is automatically engaged whenever the accelerator pedal is heavily depressed during periods of major load upon the engine.

At its other end, the power shaft 22 is drivingly connected to a bevel gear 25 meshingly engaging two pinion gears 26 and 28 mounted on the vehicle body for rotation about concentric axes perpendicular to the axis of the power shaft 22 and spaced on opposite sides thereof. The pinions 26 and 28 are fixedly connected to associated flywheels 30 and 32, respectively, for concurrent rotation therewith. Suitable low friction bearings (not shown) are provided for the rotating flywheels and pinions.

It will be appreciated that the bevel and pinion gear system described insures that the flywheels 30 and 32 rotate in opposite directions to eliminate gyroscopic precession forces. In addition, the gear ratio between the bevel and pinion gears is such as to insure that when the flywheels are rotating at their predetermined full speed (to be described), the rotational speed of the power shaft 22 is considerably in excess of any maximum rotational speed of the engine input shaft 8 encountered in normal use of the engine 2.

The flywheels 30 and 32 are relatively massive. Together they have a mass equivalent to a substantial proportion of the mass of the engine 2 and are rotated by the motor 20. The motor 20 is provided with a conventional control unit 33 which permits the motor 20 to run at a predetermined full speed and not to exceed the full speed. At the predetermined maximum speed of the motor 20, the flywheels store sufficient energy to provide for rapid acceleration of the vehicle from standstill to its maximum operating speed at least once when engaged with the drive wheels (as will be described).

A governor may, if desired, be connected with the flywheels responsive to the speed of rotation thereof to automatically break the electrical connection to the motor 20 when flywheels reach their predetermined full speed, thus providing additional limitation against overspeeding of the flywheels. The governor automatically remakes the electrical connection when the wheels are below the predetermined full speed.

Although an electrical system has been described for diverting power from the engine 2 to the flywheels, other systems such as, for example, pneumatic or hydraulic systems could alternatively be used. For example, the engine 2 could be arranged to drive an air compressor to deliver compressed air to a turbine drivingly connected to the flywheels.

The flywheels 30 and 32 are also enclosed in a sealed compartment 34 filled with a gas of low molecular weight to reduce windage losses acting on the wheel so that their rotating motion may be improved. In the preferred embodiment, hydrogen is used, though other suitable low molecular gases, or vacuum may be provided.

A direct current electrical storage battery 36 of any conventional type is also connected to supply the electric motor 20 for a purpose to be described. The battery 36 is connected in parallel with the converter 16 to be charged thereby when the alternator is running.

Electrical connections to a common ground, such as the chassis, are made to the various elements in accordance with conventional electrical practice.

The system may also be provided with visual indicators such as a rate indicator to inform the driver of the speed at which the flywheels are rotating as a percentage of their predetermined full rotational speed. This gives him an indication of what reserve of additional power he has available for acceleration at any time, so that he may, for example, consider whether or not to overtake another vehicle.

Operation

In operation, the vehicle is started by disengaging the clutch 24 to disconnect the power shaft 22 from the engine shaft 8. The battery 36 is then electrically connected to the motor 20 to turn it until the wheels 30 and 32 are rotating rapidly. At this time, the clutch 24 is engaged to drivingly connect the power shaft 22 with the engine input shaft 8 so that some of the mechanical rotational energy stored in the wheels is imparted to the engine 2 to turn it over rapidly to provide a quick start. The automatic transmission 6 is then engaged and the vehicle starts to move.

Once the operating speed has been reached, the engine 2 has sufficient power output on its own to keep the vehicle traveling continuously on the level at the same speed with the engine 2 operating at less than full load. An additional portion of the mechanical power output of the engine 2 is delivered to the alternator 12 and converted into alternating electrical current. The electrical current is converted into direct current by the converter 16 and applied to the electric motor 2 to run the flywheels 30 and 32 up to their predetermined full operating speed. Once the flywheels have reached their predetermined full speed, the control unit 33 prevents further increase in the speed of the flywheels by the electric motor. At this time, the power output requirement of the engine 2 will decrease somewhat with the result that the driver will be able to maintain the same road speed although easing back somewhat on the engine fuel intake as determined by his foot pressure on the accelerator pedal.

If it becomes necessary for the driver to overtake another vehicle or to ascend an incline, the driver operates the selective clutch 24 to couple the flywheels 30 and 32 to the engine through the shafts 22 and 8 to enable the engine to meet the increased load requirements necessary to insure acceleration at an adequate rate. As the flywheels 30 and 32 are arranged, at their predetermined operating speed, to rotate the shaft 22 at a higher rate than the engine shaft 8 (as previously described), it is necessary to provide for a certain amount of slippage in the clutch connection between the power and engine shafts. This is so that the stored mechanical energy from the flywheels is not fed to the engine at such a high rate as to cause overspeeding of the engine to the extent that it might be damaged or the vehicle placed in a hazardous situation. Once the period of acceleration has terminated, the clutch 24 is selectively disengaged and travel at the constant speed, is resumed. At the same time, the flywheels 30 and 32 are run back up to their predetermined full speed.

It will be appreciated that although the power required to accelerate the vehicle at an acceptable rate is in excess of the full load power output of the engine 2, the power margin is made up by the excess energy delivered from the rotating flywheels to the engine through the clutch 24 and the shafts 8 and 22. In fact the division of power is such that almost all acceleration power is provided by the redelivery of stored energy from the flywheels with the engine 2 providing power only for maintaining cruising speed and accelerating the flywheels during cruising periods. At it is in acceleration periods that a major portion of exhaust pollutants are produced by conventional automobiles, the use of flywheels which produce no exhaust gases upon acceleration provides a considerable reduction in air pollution.

When it is desired to slow the vehicle, the clutch 24 is left disengaged and the vehicle braked in the normal manner so that the stored energy in the flywheels is not permitted to act against the desired retardation, as it would if the flywheels were permanently mechanically coupled to the engine. After the vehicle has been brought to rest, the flywheels 30 and 32 continue to spin for some hours. This is due to the very low friction of the previously described anti-friction bearings and due to the provision of the hydrogen atmosphere in which they are enclosed. It will be appreciated that restarting of the vehicle after only a short period of rest (such as a break at a roadhouse) while the flywheels 30 and 32 are already still rotating, is particularly facilitated.

Example.—As an exemplification of the relative dimensions of the various components, an application of the vehicle system to a conventional four-door American sedan is discussed.

Conventional sedan

Weight (fully laden with passengers and luggage) _____ 4,800 pounds.
Standard engine:
    Type _____ Spark ignition.
    Weight _____ 800 pounds.
    Displacement _____ 427 cu. inches.
    Output _____ 425 B.H.P. at 6000 r.p.m.
Acceleration at weight above __ 0–60 m.p.h. in about 15 seconds.

Vehicle as modified

| | |
|---|---|
| Weight (fully laden) | Same. |
| Engine: | |
|    Type | Diesel. |
|    Weight | 500 pounds. |
|    Displacement | 125 cu. inches. |
|    Output | 60 B.H.P. at 4200 r.p.m. |
| Flywheels | two 12-inch mean diameter turning 24,000 r.p.m. maximum rim speed 1100 ft. per sec., weight 97.8 pounds each. |
| Electric motor | 5 h.p. |
| Accelerations | (a) 5 normal accelerations 0 to 60 m.p.h. in 10 secs. in any 3-min. period; or, |
| | (b) Fifteen 0 to 30 m.p.h. accelerations in 10 secs. in any 3-min. period; or, |
| | (c) 8 normal 30 to 60 m.p.h. accelerations in 10 secs. in any 3-min. period. |
| Cruise | 85 m.p.h. continuously on level highway. |

Although it will be appreciated from the example that the total number of accelerations that can be performed in a given period may be reduced, it will be seen that in general the vehicle system of the invention has permitted the use of an engine of less than a third of the displacement capacity of the conventional engine without an unacceptable sacrifice of either the velocity or acceleration performance likely to be required in average driving conditions.

It will be appreciated that these values may be changed by altering the flywheel or electrical motor characteristics.

SUMMARY OF ADVANTAGES

It will be appreciated that in utilizing a vehicle power system according to the present invention, certain significant advantages are provided.

In particular, the use of an energy reservoir for storing surplus engine output during periods of operation of less than full load for later use during periods of overload, permits a smaller engine capacity than heretofore to be utilized without significant loss of vehicle performance thereby reducing air pollution.

In addition, improved fuel mileage results from the use of the structure described.

Also significant is the provision of a selectively operated clutch to connect the flywheels to the engine to permit the application of stored energy to overcome extra load conditions under the selective control of the driver only at times when he deems it necessary. Additionally, this selective application of the stored energy to the engine avoids dangerous situations arising out of the possibility that energy feed-back may occur during periods of deliberate engine retardation such as during normal braking.

Other advantages are provided by using a clutch of the slip type to ensure that redelivery of the stored energy at too high a rate to the engine body to cause overloading thereof, cannot occur.

Also significant is the provision of an electrical storage battery in connection with an electric motor driving the flywheel as this permits the flywheel to be run up to a high speed prior to starting to give a rapid turn-over to the engine to ensure a quick start with minimized air pollution.

Other advantages are provided by the low friction bearings and by the hydrogen atmosphere surrounding the flywheels which ensures minimum friction losses of the energy stored in the flywheels. This, in addition, permits them to continue to run for several hours after motion has ceased, thereby facilitating a rapid restart of the engine after a short period of shutdown.

I claim:
1. A method of providing power for a vehicle of the type having a body adapted to be moved by power responsive, motion producing means, the method comprising the steps of:
   providing an engine to supply mechanical power to the motion producing means,
   diverting a portion of the mechanical power output of the engine to rotate a flywheel to store mechanical energy in the flywheel, and
   selectively and operatively clutchingly engaging the flywheel with the motion producing means to provide a power supplement for the engine at predetermined times;
   the step of diverting a portion of the mechanical power output of the engine comprising diverting said portion of mechanical power to the flywheel through a unidirectional power take-off means to thereby prevent energy feed-back from the flywheel through the unidirectional power take-off means to the engine and the motion producing means.

2. A method as defined in claim 1 including the step of:
   selectively supplying electrical power to rotate the flywheel from a source independent of the engine.

3. A method of providing power for a vehicle of the type having a body adapted to be moved by power responsive, motion producing means, the method comprising the steps of:
   providing an engine to supply mechanical power to the motion producing means,
   diverting a portion of the mechanical power output of the engine to rotate a flywheel to store mechanical energy in the flywheel, and
   selectively, clutchingly engaging the flywheel with the engine to provide a power supplement therefor at predetermined times,
   the step of diverting a portion of the mechanical power output of the engine including the steps of:
      converting a portion of the mechanical power output of the engine to electrical power,
      supplying the electrical power to an electric motor drivingly connected to the flywheel, and
      rotating the flywheel by the electric motor.

4. A method as defined in claim 2 wherein the step of converting a portion of the mechanical power output to electrical power includes:
   connecting an electrical generator with the engine to produce alternating current electrical output,
   converting the alternating current electrical output to direct current by use of an electrical converter,
   supplying the direct current electrical power to a direct current electric motor driving the flywheel; and
   connecting an electrical storage battery in parallel electrical connection with the electrical motor and the converter.

5. A power system for a vehicle of the type including a body and power-responsive, motion producing means connected with the body for producing movement thereof, the power system including:
   engine means adapted for operative connection with the motion producing means to supply power thereto for movement of the body,
   power take-off means connected with said engine means for diverting a proportion of the power output of said engine means,
   power storage means connected with said power take-off means for accumulating and storing the power diverted by said power take-off means, and selectively operable power connection means, independent of said power take-off means, for operatively connecting said power storage means with the motion producing means to supply stored power to the motion producing means at predetermined times;

said power take-off means comprising a unidirectional power take-off means for diverting said proportion of power output of said engine means to said power storage means while continuously preventing energy feed-back from said power storage means through said unidirectional power take-off means to said engine means and to the motion producing means.

6. A power system as defined in claim 5 wherein:

said power storage means includes flywheel means for storing mechanical rotational energy, said flywheel means further including:
a rotary power shaft, said engine means further including:
an input shaft, said power connection means including:
a selectively engageable slip clutch for connecting said power and input shafts in driving relation but permitting a certain amount of relative slipping motion between said shafts.

7. A power system as defined in claim 5 including:

means independent of said power take-off means for selectively supplying power for storage by said power storage means.

8. A power system for a vehicle of the type including a body and power-responsive, motion producing means connected with the body for producing movement thereof, the power system including:

engine means adapted for operative connection with the motion producing means to supply power thereto for movement of the body, power take-off means connected with said engine means for diverting a proportion of the power output of said engine means, power storage means connected with said power take-off means for accumulating and storing the power diverted by said power take-off means, and selectively operable power connection means for connecting said engine means with said power storage means to supply stored power therefrom to said engine means at predetermined times, said engine means including:
combustion engine means having:
drive shaft means adapted for operative connection with the motion-producing means;

said power take-off means including:
electrical generating means connected with said drive shaft means for providing an electrical output,
electric motor means electrically connected with generating means;

said power storage means including:
flywheel means operatively connected with said electric motor means for storing mechanical, rotational energy in said flywheel means;

said power connection means including:
selectively operable clutch means for connecting said flywheel means to said drive shaft means of said combustion engine means for delivery of stored power thereto.

9. A power system as defined in claim 8 wherein said flywheel means further includes:

two flywheels mounted for opposite rotation about concentric axes of rotation, said flywheels being of sufficient mass and being rotated at sufficient speed by said electric motor means to possess sufficient momentum to cause adequate acceleration of the body in and through the usual range of operating speeds thereof.

10. A power system as defined in claim 9 further including:
a sealed housing enclosing said flywheels, and
an atmosphere of low molecular weight gas within said housing surrounding said flywheels.

11. A power system as defined in claim 8 wherein:

said generating means includes a alternating current generator for producing alternating current electrical energy, said system further including:
converter means for converting the alternating current output of said generating means to direct current,
said electric motor means including a direct current electric motor, and said system further including:
an electrical battery in parallel electrical connection with said converter means and said motor.

12. A power system as defined in claim 8 wherein said vehicle is a land vehicle including a body having ground-engaging drive wheels, said engine means comprising:
a compression-ignition engine having an output shaft adapted for driving connection with the drive wheels;

said flywheels being drivingly connected to a power shaft, said clutch means including:
a clutch operatively connected with said power shaft and said engine drive shaft for selectively connecting said shafts in driving relation.

13. A method of providing power for a vehicle of the type having a body adapted to be moved by power-responsive, motion producing means, the method comprising the steps of:

providing an engine to supply mechanical power to the motion producing means, diverting a portion of the mechanical power output of the engine to rotate a flywheel to store mechanical energy in the flywheel, and selectively and operatively clutchingly engaging the flywheel with the motion producing means to provide a power supplement for the engine at predetermined times, the step of diverting a portion of the mechanical power output of the engine including the steps of:
converting a portion of the mechanical power output of the engine to electrical power,
supplying the electrical power to an electric motor drivingly connected to the flywheel, and
rotating the flywheel by the electric motor.

14. A power system for a vehicle of the type including a body and power-responsive, motion producing means connected with the body for producing movement thereof, the power system including:

engine means adapted for operative connection with the motion producing means to supply power thereto for movement of the body, power take-off means connected with said engine means for diverting a proportion of the power output of said engine means, power storage means connected with said power take-off means for accumulating and storing the power diverted by said power take-off means, and selectively operable power connection means for operatively connecting said power storage means with the motion producing means to supply stored power from said power storage means to the motion producing means at predetermined times, said power take-off means including:
electrical generating means connected with said engine means for providing an electrical output, and electrical motor means electrically connected with said generating means and drivingly connected with said power storage means.

References Cited

UNITED STATES PATENTS

| | | | |
|---|---|---|---|
| 1,021,116 | 3/1912 | Ure | 74—572 XR |
| 2,062,583 | 12/1936 | Kruczek | 180—1 |
| 2,589,453 | 3/1952 | Storsand | 180—65 XR |
| 2,935,899 | 5/1960 | Nallinger | 180—1 XR |
| 3,387,683 | 6/1968 | Budzich | 180—66 |

LEO FRIAGLIA, Primary Examiner

M. L. SMITH, Assistant Examiner

U.S. Cl. X.R.

74—572